United States Patent
Barnhill et al.

(10) Patent No.: US 6,601,769 B2
(45) Date of Patent: Aug. 5, 2003

(54) ON-SITE MULTIPLE MEDIA APPLICATION DEVICE FOR CREDIT TYPE CARDS

(76) Inventors: Scott Barnhill, 10801 Stevenson Rd., Stevenson, MD (US) 21153; Gregory Barnhill, 10801 Stevenson Rd., Stevenson, MD (US) 21153; Guy H. Parr, Jr., 116 Ridgewood Rd., Baltimore, MD (US) 21210

(*) Notice: Subject to any disclaimer, the term of this patent is extended or adjusted under 35 U.S.C. 154(b) by 116 days.

(21) Appl. No.: 09/788,436

(22) Filed: Feb. 21, 2001

(65) Prior Publication Data

US 2002/0113130 A1 Aug. 22, 2002

(51) Int. Cl.[7] .................................... G06K 19/00
(52) U.S. Cl. .................... 235/487; 235/493; 235/494
(58) Field of Search ..................... 235/497, 493, 235/494, 487; 283/81, 99, 100, 101

(56) References Cited

U.S. PATENT DOCUMENTS

| | | | | |
|---|---|---|---|---|
| 3,575,556 A | * | 4/1971 | Wolf et al. ................... 379/87 |
| 3,656,131 A | * | 4/1972 | Libby et al. ................. 360/137 |
| 3,711,359 A | * | 1/1973 | Lawhead et al. ........... 156/358 |
| 4,051,484 A | * | 9/1977 | Martin ....................... 346/74.2 |
| 4,090,662 A | * | 5/1978 | Fayling ....................... 235/493 |
| 4,113,141 A | * | 9/1978 | Kronfeld ....................... 221/70 |
| 4,259,699 A | * | 3/1981 | Yoshida ..................... 360/130.2 |
| 4,564,414 A | * | 1/1986 | Houssian et al. ........... 156/230 |
| 4,568,921 A | * | 2/1986 | Pokalsky ................... 340/572.3 |
| 5,057,347 A | * | 10/1991 | Alvin ........................... 428/43 |
| 5,270,522 A | * | 12/1993 | Bone, Jr. ..................... 235/375 |
| 5,308,121 A | * | 5/1994 | Gunn ........................... 283/99 |
| 5,501,491 A | * | 3/1996 | Thompson ..................... 283/70 |
| 5,700,037 A | * | 12/1997 | Keller ......................... 283/106 |
| 5,710,417 A | * | 1/1998 | Joseph et al. .......... 235/462.11 |
| 5,984,191 A | * | 11/1999 | Chapin, Jr. ................. 235/487 |
| 6,183,017 B1 | * | 2/2001 | Najor et al. ................ 283/101 |
| 6,241,152 B1 | * | 6/2001 | Fukasawa .................... 235/449 |
| 6,264,396 B1 | * | 7/2001 | Dobrovolny ................ 403/391 |

* cited by examiner

Primary Examiner—Diane I. Lee
Assistant Examiner—Kimberly Nguyen
(74) Attorney, Agent, or Firm—Sughrue Mion, PLLC

(57) ABSTRACT

A supplemental computer readable medium is applied to an existing credit card of a customer by a merchant at the point of sale or place of business with a lightweight, simple applicator. The use of supplemental computer readable media on existing cards reduces the bulk that must be carried by the customer, and provides the customer with a computer readable medium in a convenient format.

11 Claims, 1 Drawing Sheet

ON-SITE MULTIPLE MEDIA APPLICATION DEVICE FOR CREDIT TYPE CARDS

BACKGROUND OF THE INVENTION

1. Field of the Invention

The present invention relates to an apparatus for applying a computer-readable media strip to an existing credit card by a merchant, and a method of providing a customer with a portable and rugged computer readable medium without the need to provide an additional card to bear the medium.

2. Related Art

A growing problem, and an increasing need, arises out of the inconvenience of having to carry a number of credit cards serving a number of purposes. Increasingly, new cards are being issued for specialized purposes.

One example is the cards given to hotel residents in lieu of keys to gain access to hotel rooms and services. These cards currently contain a stripe of magnetic media which may be read by a door control device to allow access to a room or service. The media, in fact, uses only a relatively small area of the attendant card.

The purpose of the card lies in the need to provide a customer with a computer readable medium that is rugged and portable—something the customer will not mind bringing with him to the merchant on subsequent visits.

Another example is the check cashing card given by grocery store chains. The check cashing card has a media strip such as a magnetic strip or a bar code strip. Likewise, libraries and video rental stores issue cards to their patrons for tracking purposes. In the same vein, office buildings or other facilities use token-based security in which employees are issued cards or the like having on them computer readable media.

It would seem that there is a critical mass with respect to the number of cards that one may be able to pocket conveniently. A single card has a thickness of approx. 0.050 inches including embossing. Ten cards would have a thickness of ½ inch and 20 cards a thickness of 1 inch. An inch of cards, for example, is not convenient to carry in a hip wallet. As cards continue to proliferate, the problem of card management therefore continues to grow.

SUMMARY OF THE INVENTION.

One object of the invention, among others, is to provide a solution to the foregoing problem of the need for one person to carry too many cards. According to the preferred embodiment of the invention, supplemental media are applied to existing cards at a merchant location. The existing cards are typically credit cards issued by financial institutions. Affixing supplemental media is simplified by an applicator apparatus according to the invention.

The invention is also realized in a method of providing a customer with a computer readable medium in which a merchant takes advantage of the supplemental media to provide convenience to customers.

The method as revealed in this application of using existing cards for more than a single application is more cost efficient and space efficient. Also, certain economies may be achieved both with respect to cost as well as material consumption, by using these cards for more than a single purpose.

The manner in which the above-identified objectives and others are realized will become apparent by way of the following description of exemplary embodiments, taken in conjunction with the enclosed drawing figures.

BRIEF DESCRIPTION OF THE DRAWING FIGURES

Figure 1:
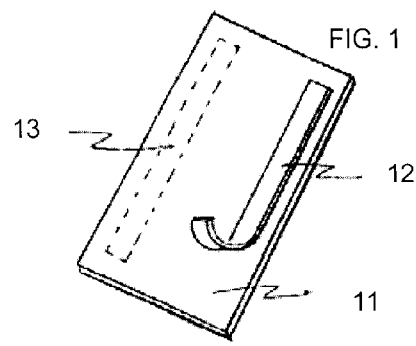
FIG. 1 shows the support member onto which media may be placed.

DETAILED DESCRIPTION OF THE PREFERRED EMBODIMENTS.

The invention resides in the application of a supplemental computer readable medium to an existing credit card, in an apparatus for applying such supplemental media, and in the use of such supplemental media in a method of providing to a customer a computer readable medium. Terms used in this description in a special way.

It will be appreciated that the supplemental computer readable media to be applied can be applied to any kind of card, and that the card need not be a credit card. For the sake of generality, then, the term "support member" is introduced. A support member includes credit cards, but also includes any other kind of card whether it is a credit card or not. For example, a supplemental computer readable medium could be applied to a library card. The library card would clearly fall within the ambit of the term "support member".

The term "computer readable medium" will be understood to include not only magnetic strips, but also strips having bar codes affixed, and also strips having embedded computer chips. It will be understood to include shapes that are not strips. Other, hereafter developed technologies for reading by computers may evolve, and such technologies are meant to be included in "computer readable medium".

The term "supplemental computer readable medium" also has a special meaning herein. Although the preferred embodiment of the invention described herein is intended for use with credit type cards (a situation in which there already exists a computer readable medium on the support member, and in which the supplemental computer readable medium is added to the support member), it may be used in situations in which a customer has a card that does not have an existing computer readable medium (like some driver's licenses). Thus, in a broader sense, a supplemental computer readable medium is one that is applied by a merchant as a supplement to an existing support member of a customer, whether the existing card of the customer has an extant media strip or not.

"Merchant", as used herein, is meant to refer to someone like a grocer, clerk, librarian, deacon, or the like as a representative of an organization having some reason to affix a supplemental computer readable medium to a support member of a customer. Thus, "merchant" does not have its ordinary meaning in this application, but has a broader meaning free of the necessity for a commercial transaction or dealing in goods. Thus, an employer affixing a supplemental computer readable medium to a support member of an employee would be considered a merchant in this document.

The term "customer" also, as used herein, has a broader meaning than normal. "Customer" refers to any holder of a card to which a supplemental computer readable medium is affixed by a merchant.

Constitution of an Applicator Apparatus

The application of a supplemental computer readable medium to a support member should generally be performed with an apparatus, owing to the typical thin quality of magnetic strips and the like. Manual application results in misalignment, wrinkles, tears, and other damage to a supplemental medium.

The apparatus for applying a supplemental computer readable medium will now be discussed in more detail. In this description, the term "supplemental computer readable medium" may (for the purpose of linguistic convenience) be referred to simply as the medium or media.

FIG. 1 shows the support member onto which media may be placed. In FIG. 1, reference numeral 11 shows a support member that receives the applied media. Reference numeral 12 shows the applied media. Reference numeral 13 shows any existing media.

Figure 2:
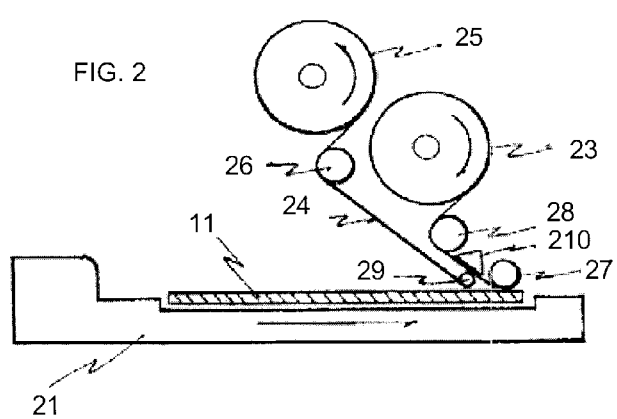
FIG. 2 is the media application mechanism that is used to apply supplemental media to existing support members.

FIG. 2 shows the media application mechanism that is used to apply new media to existing support members. Reference numeral 21 shows the transport base that holds the support member as it is pushed through the applicator. Reference numeral 11 shows the card in position for media application. Reference numeral 23 shows the reel which holds the media supply tape. Reference numeral 24 shows the media backing tape after the media has been released. Reference numeral 25 shows the take up reel that receives the backing tape. Reference numeral 26 shows the idler pulley which maintains tension on the line to the take up spool. Reference numeral 27 shows a pressure roller that acts against the adhesive backed media to force optimum contact between the media and the card.

Although it is mentioned above that the support member is pushed through the applicator, it is equally appropriate if the applicator is moved relative to the support member, with the support member being held fast while the applicator is pushed over it. It is sufficient that there is some relative motion between the two.

Reference numeral 28 indicates a spool that acts as an idler and tape positioning spool. Sprockets on this spool engage the perforations (shown on FIG. 4, reference numeral 43) of the media supply tape to preserve media supply tape alignment prior to media release. Reference numeral 29 indicates a sharp angle means that provides a sharp angle for the media supply tape to traverse, forcing the adhesive backed media to release. This can be either in the form of a small diameter journal or a smooth surface wedge with the sharper edge facing the card. Whether a wedge or journal or other equivalent structure is used, it will be understood that this part may be more generally referred to as a means for separating the supplemental computer readable medium from the supply tape. Reference numeral 210 represents a tape stabilization device that assures the media will be in proper alignment at time of release.

Figure 3:
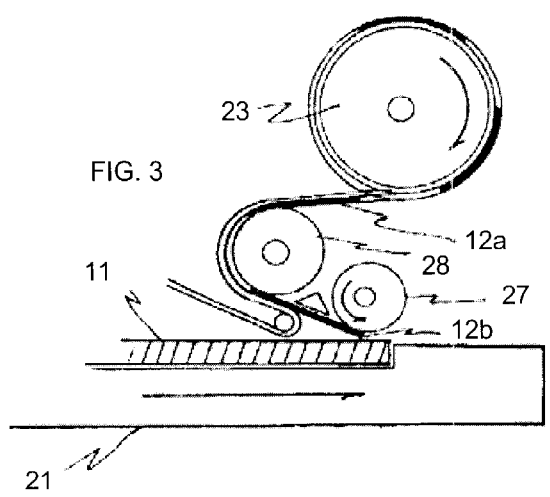
FIG. 3 is an enlarged view of the tape transport mechanism and applicator.

FIG. 3 is an enlarged view of the tape transport mechanism and applicator. Reference numeral 21 shows the card holder and transport. Reference numeral 11 shows the card as placed on the transport. Reference numeral 23 shows the media tape supply spool. Reference numeral 12a shows the media supply tape prior to media release. Reference numeral 28 shows the tape supply tension and alignment spool. Reference numeral 27 shows a pressure roller that acts against the adhesive backed media to force optimum contact between the media and the card. Reference numeral 12b shows the media as it is being released from the backing tape and as it is being forced in place by the pressure roller.

Figure 4:
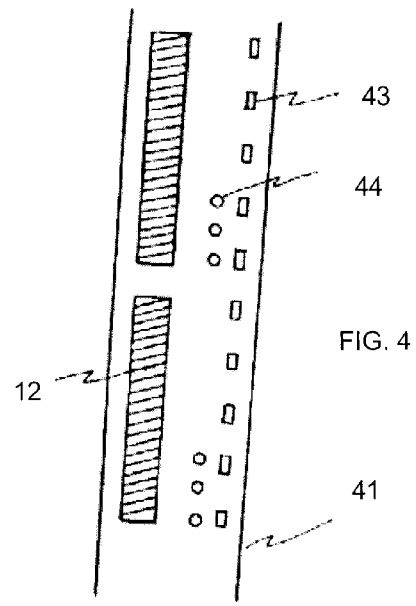
FIG. 4 shows the detail of the media supply tape.

FIG. 4 shows the detail of the media supply tape. Reference numeral 41 shows the matrix on which the media is carried. Reference numeral 12 shows the adhesive backed supplemental computer readable medium prior to application. Reference numeral 43 shows tape alignment sprocket holes. Reference numeral 44 shows indexing perforations used to position the tape with respect to the incoming card.

The design is for a device that would lay a number of media strips in parallel on a single card, as well as make such application on both sides of the same card. Without significantly changing currently used card readers it would then be possible to have a single card to be used for a variety of purposes and in a variety of locations. It would be possible for a given location to have multiple levels of security accorded to a single card, again by the application of several strips of media in parallel with one another.

Because the media is applied as a separate, adhesive backed entity, as opposed to the usual method of coating the card directly, it then becomes possible to readily remove the media by stripping it off as one would strip off a bit of cellophane tape. The advantage being that if the applied strip is no longer needed, it can be easily removed. For example, if the strip were to be applied at a hotel for access to a room, the strip could be used for the length of stay and then removed at the end of the period.

Although the strip is envisioned to be on the order of 5/16" in width, which is the requirement for typical card readers, it should not be limited to that width. The preferred media matrix (or backing) thickness would be on the order of 3 mils (0.003") thick and of Mylar™ construction, but not limited to that construction or that thickness. Other shapes, such as dots or the like may be used. Strips are advantageous in that they are easy to read with current reader technology.

A particular advantage of this concept is that the media may be applied at point of use, i.e. that a small, relatively inexpensive, and readily portable device requiring no external power is used to make the application. This is contrasted with the very large and expensive industrial applicators currently in use which are only economically feasible in production of very large quantities of cards as demanded by the credit card industry. The applicator in this design, for example, could weigh no more than 30 or 40 ounces and can be constructed for no more than a few hundred dollars while the existing applicators may weigh hundreds of pounds and cost tens of thousands of dollars; virtually useless for the proposed application.

Operation of the Apparatus

The design calls for the use of a portable device capable of applying new media to a support member that is typically plastic. A spool of tape on which is placed adhesive backed media resides in the device. A card is placed in a holder, similar to holders frequently used by retailers to imprint receipts when making credit card purchases. As the carrier is pressed forward, the spool of media supply tape is engaged causing a strip of media to be removed from the media supply tape and applied directly to the card. The carrier and the supply tape are synchronized so as to assure that the applied media is dispensed in a consistently accurate manner with respect to placement on the card. A pressure roller forces the adhesive backed media tightly against the card assuring adequate bonding. The carrier may be adjusted so that more than one strip of media may be applied to the same card. Additionally, the card may be inverted so that media may be applied to the obverse side as well as the reverse side.

Concerns regarding interference from having magnetic media on opposing sides of the same card are relieved because the medium tape must be in close proximity to the tape read/write head to be read or written upon. The signal attenuation, or signal loss of a typical card read/write head is approximately 20 db per mil of distance from the active media surface to the read/write head surface, and goes as the square of the distance. The thickness, or the distance from one surface of a typical card to the other, is substantially greater than 10 mils (0.010"). Therefore, one would expect that neither the imposition of signal or the reading of signal from media on one side of the card to affect media applied to the opposite side of the card.

The card with media applied may be used with any device capable of imposing or imprinting information on a computer readable medium. Because of the proliferation of readers for magnetic strips, it is preferred that the supplemental computer readable medium be a magnetic strip. Once imprinted, the card may be used in any device capable of reading the information thus imposed on the strip.

Although magnetic media is used for illustration purposes, the concept does not restrict itself to that media alone. It is envisioned that other media would also be applied in the same fashion. A UPC code strip may be substituted for the magnetic media shown in the illustration, or electronic chips embedded in the supply tape and adhered to the card would serve the same purpose. In every case, these media could be applied onsite, and on an as needed basis.

Method of Providing a Medium to a Customer

Today, merchants often issue cards with pre-affixed computer readable media. By virtue of the present invention, merchants can operate in a new and less costly manner. In particular, the merchant can operate according to a method characterized in that the merchant applies a supplemental computer readable medium to a support member of a customer. The merchant obtains the support member from the user (i.e., a credit card, driver's license, or the like). At the merchant's location, the merchant applies to the support member of the customer a supplemental computer readable medium. The medium may be preformatted with information or not. If not, the merchant causes the desired information to be stored on the supplemental computer readable medium. The merchant then can subsequently read the supplemental computer readable medium with a reader. The customer/user can remove the supplemental medium when it is no longer desired, without harming the integrity or the readability of the existing support member's integral computer readable medium.

Conclusion

Although the invention has been described with respect to many specificities in terms of a preferred embodiment, it will be realized by those familiar with this field that many changes can be made to the design of the apparatus, and that some departure from the shape of the supplemental medium also is possible. Such changes and departures are mainly cosmetic. Therefore, the scope and reach of this invention is to be construed not just in terms of the examples disclosed herein, but rather in terms of the appended claims.

There is claimed:

1. A method of providing a customer with a magnetic computer readable medium, comprising:
    said customer providing a support member to a merchant, said support member having an existing integral magnetic computer readable medium at an existing location on said support member; and then
    said merchant placing said support member of said customer in an applicator apparatus of said merchant at a point of sale site of said merchant; and then
    said merchant applying a supplemental magnetic computer readable medium to said support member, in a location different from said existing location of said existing integral magnetic computer readable medium, using said applicator; and then
    said merchant providing said support member, having said existing integral computer readable medium and also said supplemental magnetic computer readable medium, to said customer.

2. The method of providing a customer with a magnetic computer readable medium as set forth in claim 1, wherein said supplemental magnetic computer readable medium is a magnetic strip.

3. The method of providing a customer with a magnetic computer readable medium as set forth in claim 1, wherein said supplemental magnetic computer readable medium is removable by said customer.

4. The method for providing a customer with a magnetic computer readable medium as set forth in claim 1, wherein said applicator comprises:
    a transport base holding said support member, a supply reel, a take up reel, a pressure roller, a tape carrying said supplemental computer readable medium, and means for separating said supplemental computer readable medium from said tape;
    said tape being disposed in said apparatus along a tape feed path defined by said supply reel, said pressure roller, said separating means, and said take up reel, said tape feed path having a direction of tape feeding from said supply reel to said take up reel;
    said separating means being operably disposed with respect to said support member so that said supplemental computer readable medium, after said separating, is next to said support member; and
    said pressure roller causing said supplemental computer readable medium, after said separating, to be pressed upon said support medium.

5. The applicator apparatus as set forth in claim 4, further comprising:
    a tape positioning spool disposed along said tape feed path between said supply reel and said pressure roller; and
    an idler pulley disposed along said tape feed path between said separating means and said take up reel;
    said transport base being slidable with respect to said pressure roller so as to transport said support medium in an affixing direction, opposite said direction of tape feeding; and
    said tape positioning spool and said idler pulley maintaining tension on said tape when said transport member is moved in said affixing direction.

6. The applicator apparatus as set forth in claim 5, further comprising:
    said tape having holes; and
    said pressure roller having sprockets adapted to engage said holes of said tape.

7. The applicator apparatus as set forth in claim 6, further comprising indexing holes in said tape.

8. A method for a merchant to provide a customer with a computer readable medium, comprising:
    said customer providing a support member to said merchant; and then
    at a location of said merchant, said merchant using an applicator to apply a supplemental computer readable medium to said support member of said customer; and then
    said merchant providing said support member, having said supplemental computer readable medium, to said customer; and then said merchant reading said supplemental computer readable medium borne on said support member of said customer.

9. The method of providing a customer with a computer readable medium as set forth in claim 8, wherein said supplemental computer readable medium is a magnetic strip.

10. The method of providing a customer with a computer readable medium as set forth in claim 8, wherein said supplemental computer readable medium is removable by said customer.

11. The method of providing a customer with a computer readable medium as set forth in claim 8, wherein said applicator apparatus comprises:

a transport base holding said support member, a supply reel, a take up reel, a pressure roller, a tape carrying said supplemental computer readable medium, and means for separating said supplemental computer readable medium from said tape;

said tape being disposed in said apparatus along a tape feed path defined by said supply reel, said pressure roller, said separating means, and said take up reel, said tape feed path having a direction of tape feeding from said supply reel to said take up reel;

said separating means being operably disposed with respect to said support member so that said supplemental computer readable medium, after said separating, is next to said support member; and said pressure roller causing said supplemental computer readable medium, after said separating, to be pressed upon said support medium.

* * * * *